Jan. 12, 1954　　　　　　E. R. PRICE　　　　　　2,666,103
SWITCH MECHANISM

Original Filed Sept. 28, 1949　　　　　　　　　　　　　　　2 Sheets-Sheet 1

INVENTOR.
EARL R. PRICE
BY
H. O. Clayton
ATTORNEY

Jan. 12, 1954  E. R. PRICE  2,666,103
SWITCH MECHANISM
Original Filed Sept. 28, 1949  2 Sheets-Sheet 2

INVENTOR.
EARL R. PRICE
BY
H. O. Clayton
ATTORNEY

Patented Jan. 12, 1954

2,666,103

UNITED STATES PATENT OFFICE

2,666,103

SWITCH MECHANISM

Earl R. Price, South Bend, Ind., assignor to Bendix Aviation Corporation, South Bend, Ind., a corporation of Delaware Original application September 28, 1949, Serial No. 118,369. Divided and this application March 26, 1951, Serial No. 217,629

6 Claims.  (Cl. 200—34)

This invention relates to governor operated switch mechanisms particularly adapted for use in the controls of an automotive vehicle.

An important object of my invention is to provide a governor operated switch mechanism wherein the switch of the mechanism operates quickly at the time or shortly before the governor part of the mechanism comes to rest and again operates quickly after said governor part is activated. Now most centrifugally operated governor switch mechanism, for example, the fly-ball type of such a mechanism, includes an inertia operated control member of appreciable weight; for such a member is made necessary in order to provide a governor switch mechanism wherein the switch of the mechanism will operate, for example will close, very quickly at the time or shortly before the governor mechanism comes to a stop. However such a fly-ball switch mechanism is, because of its weight, rather slow in operation after the activation of the mechanism is initiated. Accordingly it is an object of my invention to provide a relatively lightweight governor operated switch mechanism wherein the switch of the mechanism is quickly made after or about the time the governor of the mechanism ceases to operate and is subsequently quickly broken after the operation of the governor is initiated.

A further object of my invention is to provide a simple, compact and easily serviced governor switch mechanism of few moving parts, said mechanism being adaptable for use in the power plant of an automotive vehicle.

Other objects and features of the invention will appear more fully hereinafter from a consideration of the following description taken in connection with the accompanying drawings where one embodiment of the invention is illustrated by way of example.

Figure 1:
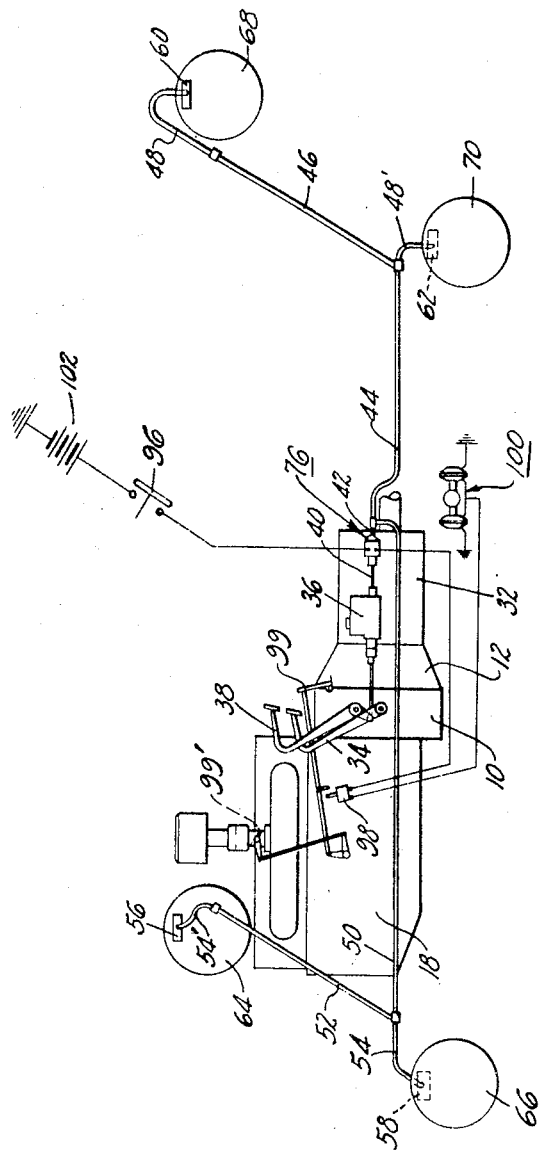
Figure 1 is a diagrammatic view disclosing the switch mechanism of my invention as being included in a brake control mechanism of an automotive vehicle.

Referring to Figure 1 disclosing schematically an automotive brake control mechanism including my invention 10 represents a fluid clutch such, for example, as the one now incorporated in several of the well known vehicles of the day. Immediately to the rear of this fluid clutch in the power transmission of the vehicle there is incorporated a conventional type of friction clutch 12. These clutches are of well known design, accordingly; no claim is made thereto; furthermore, the details of said clutches are not disclosed in the drawings inasmuch as those skilled in the art are well acquainted with their construction.

Briefly describing the clutches under discussion the fluid clutch 10 includes a rotor or driving element drivably connected to the power plant of the vehicle preferably an internal combustion engine 18. The casing of the fluid clutch houses the stator or driven element of the clutch said latter element being drivably connected to the friction clutch 12. Clutch springs of the latter bias the driven clutch element of the friction clutch into engagement with the driving clutch element, the driven element being connected with a selective change speed transmission 32 of the vehicle. A clutch pedal 34, when depressed, effects, by suitable connections, a disengagement of the friction clutch; and a shift lever, not shown, serves to operate the change speed transmission.

Now a part of the mechanism of Figure 1 is the mechanism for controlling the operation of the brakes of the vehicle. Describing this brake mechanism there is disclosed in Figure 1 a hydraulic brake system of conventional design said system including a master cylinder 36 the oil therein being subjected to a load when the brake pedal 38 is depressed said load being transmitted by the oil in lines 40, 42, 44, 46, 48, 48', 50, 52, 54, and 54', to the wheel cylinders 56, 58, 60, and 62 of the four brakes 64, 66, 68, and 70 respectively, of the vehicle. My invention is not limited, however, to its use in a hydraulic brake system for other types of brake systems may be employed.

Figure 2:
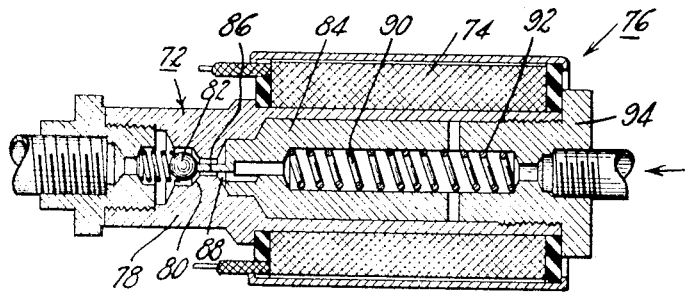
Figure 2 is a view disclosing, in section, the solenoid operated check valve or so-called no-back valve included in the braking system disclosed in Figure 1.

Referring now to Figure 2, there is disclosed therein a check valve or oft-called no-back valve 72 which valve is capable of operation when and only when solenoid 74 is energized to maintain the brakes applied. This valve and its operating means may be defined as a valve unit 76 said unit including a casing 78 bored to provide a seat 80 for a ball check valve member 82. A tubular valve operating member 84 reciprocably mounted in the casing 72 is provided with a stem 86 which projects through a duct 88 and into contact with the ball valve member 82. A compression spring 90 housed within the tubular member 84 and extending within an opening 92 in a plug 94, serves to move or bias the member 84 and the ball valve member 82 to the positions disclosed in Figure 2 the ball at this time being removed from the valve seat 90 to permit the passage of oil through the duct 88. The operation of the solenoid 74 is controlled by an ignition switch 96, an accelerator operated breaker switch 98 of conventional design, and a grounded governor operated switch mechanism 100 disclosed in detail in Figure 3, said switches being connected in series with a grounded battery 102.

The parts of the breaker switch 98 and its operating mechanism are so constructed and arranged that when the accelerator 99 is released to idle the engine the switch is closed, preferably during the last increment of release movement of the accelerator; and it follows, of course, that the switch 98 is opened during the first increment of movement of the accelerator when the same is depressed to open the throttle 99'.

Figure 3:
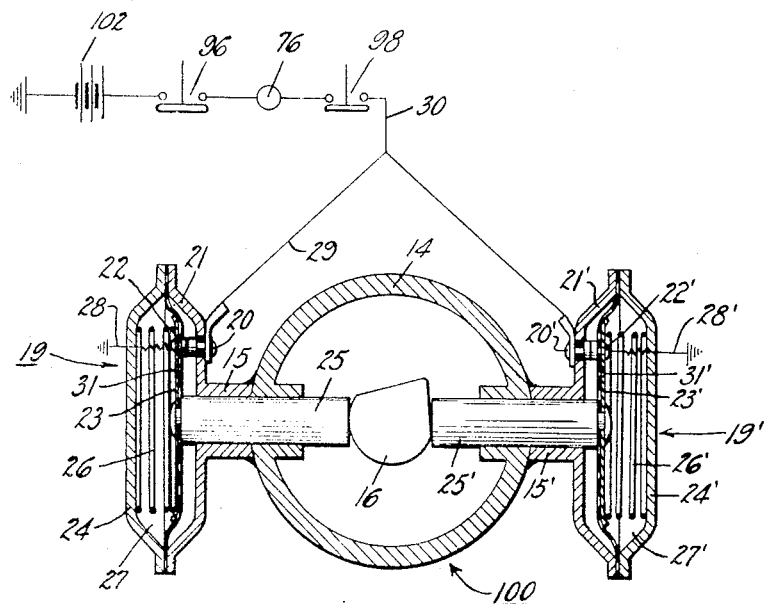
Figure 3 is a sectional view disclosing details of the governor operated switch mechanism constituting my invention.

Describing now my invention, that is the governor operated switch mechanism 100, there is disclosed in Figure 3 a preferred embodiment of this mechanism. A casing member 14 of the switch mechanism houses a drive shaft, not shown, having secured to one end thereof a cam 16; and said shaft is drivably connected to the propeller shaft of the vehicle or any other suitable mechanism whereby there is provided means for effecting a speed of rotation of the cam which is directly proportional to the speed of the vehicle.

The switch part of the mechanism includes a fixed switch contact member 20 mounted on a casing member 21 which is secured to the casing member 14 by a sleeve member 15. A movable switch contact member 22 is secured to a diaphragm 23; and this diaphragm is connected to a casing member 24 and to the casing member 21. The member 24 together with the casing member 21, the diaphragm 23, a spring 26 and a thrust member 25 go to make up a check or dashpot mechanism indicated as a whole in Figure 3 by reference numeral 19. The thrust member 25, slidable within the sleeve 15 and connected to the central portion of the diaphragm 23, is biased into abutment with the cam 16 by the spring 26; and this spring is housed within a compartment 27 outlined by the diaphragm 23 and the casing member 24. An electrical conductor 28 connected to the movable switch contact 22 and to the grounded casing member 24, serves as an electrical ground for the switch 20, 22. The fixed contact 20 of the switch is electrically connected, by a conductor 29, to a conductor 30 which is connected to the accelerator switch 98; and the latter is connected in series with the solenoid 74, the ignition switch 96 and the grounded battery 102.

Describing the operation of the switch 20, 22 a rotation of the cam 16 serves to move the thrust member 25 to the left, Figure 3, to open the switch and compress the spring 26; and in this operation the air within the motor compartment 27 is forced out of said compartment through an opening 31 in the diaphragm 23. Continued rotation of the cam 16 serves to permit the spring 26 to close the switch, the switch contact 22 moving toward the switch contact member 20 at a rate dependent upon certain factors including the strength of the spring 26 and the size of the opening 31.

Describing now the remainder of the switch portion of the governor switch mechanism 100 a check motor 19'. a duplicate of the motor 19, serves to control the closing of a switch 20', 22' and, as is evidenced from an inspection of the Figure 3, the cam 16 serves to operate said switch. The parts of the check motor 19', the switch 20', 22' and associated parts are identified by the reference numerals given to like parts of the check motor 19, switch 20, 22, and associated parts, with the addition of a prime.

Describing now the complete operation of the switch mechanism 100, when the car is traveling at or above a certain relatively low speed the cam 16 rotates fast enough to keep both of the switches 20, 22 and 20', 22' open despite the operation of the springs 26 and 26' in biasing said switches to their closed position. However, after the accelerator is released to close the switch 98 and the speed of the car falls below the aforementioned critical factor, there are periods of time when either one or the other of the aforementioned switches is closed thereby making it possible to apply the brakes and maintain the same applied; furthermore, when the car comes to a stop and the accelerator is released to close the switch 98, one or the other of said switches is closed and the brakes, after being applied, remain applied. There is thus provided a check mechanism functioning to control, by a delaying action, the closing of a governor operated switch, said mechanism also being such as to make possible a quick opening of the switch by the operation of the governor.

Describing the operation of all of the mechanism of Figure 1 should the driver elect to leave the transmission in gear when the vehicle is stopped or is about to be stopped and when the accelerator is released, he may do so without disengaging the friction clutch 12. Under these conditions it is necessary, with the mechanism of Figure 1, that is the mechanism including the two clutches, the transmission, the brakes, and the brake operating and controlling means, to apply the brakes but once; for having pressed the brake pedal the foot may then be moved therefrom inasmuch as the brakes remain applied.

Continuing the description of the operation of the no-back and/or anti-creep mechanism of Figure 1 when the solenoid 74 is energized by closing the switches 96, 98, and 100, the member 84 is drawn to the right to further compress the spring 90 thereby making possible an operation of the check valve 72. Stem 86 is moved to the right thus permitting the ball-valve member 82 to be seated by the spring. If the brakes are now applied by depressing the brake pedal, the pressure of the brake fluid upon the valve member 82 will move the same to the left to press a return spring 162 and unseat the valve. In this operation the brake fluid moves to the left, as indicated by the arrow in Figure 2, said fluid entering the member 84 from the conduit 40 connected to the master cylinder 36 and leaving the valve unit 76 by way of the conduit 42, as disclosed in Figure 1. When the brake pedal is released the force exerted by the return spring 162 and by the return springs within the wheel cylinders upon the brake fluid, result in the ball valve member 82 being moved to the right to again seat the valve. The brakes are thus locked in their applied position and are not released until the solenoid 74 is again de-energized to render the check 72 inoperative.

Summing up the features of the mechanism of Figure 1 there is provided a mechanism for efficiently and effectively controlling the power transmitted from the internal combustion engine to the propeller shaft of the vehicle. The change speed transmission cooperates with the fluid clutch, inasmuch as any one of the settings of the transmission may be selected to start the vehicle in motion. Sshould, for example, the vehicle be mired in sand, the transmission may be placed in low gear; however, on dry and level ground the fluid clutch will make possible a starting of the vehicle in a relatively high gear without choking the engine. The driver may then leave the transmission in gear when he coasts the vehicle to a stop; and to prevent creeping of the vehicle after such a stop he has merely to either apply the brakes by depressing and then releasing the brake pedal, or he may disengage the friction clutch by depressing the clutch pedal. It should also be noted that the brake controlling mechanism functions as a so-called no-roll or no-back device when the vehicle is braked to a stop on an incline; furthermore, the mechanism will function as a no-roll device after the vehicle is braked to a stop on a decline.

All of the aforementioned mechanisms, including the two clutches, the brake operating and controlling means, and the transmission, cooperate to control the transmission of power. The friction clutch 12 cooperates with the fluid clutch 10 and the transmission 32, for it is desirable at times, in a vehicle provided with a fluid clutch, to place the transmission in low or second gear. The brake controlling mechanism, including the check valve 72 and the solenoid 74, cooperate with the friction clutch and fluid clutch in preventing the vehicle from rolling backwardly after the vehicle is brought to a stop on an incline and cooperate with said clutches in preventing the vehicle from creeping forwardly after the vehicle is brought to a stop with the transmission kept in gear.

The governor operated switch mechanism 100 constituting my invention cooperates with the remainder of the mechanism of Figure 1 to provide means automatically operative to maintain the brakes applied after the speed of the car is brought down to or below a certain factor, or after the car is brought to a stop; and this governor operated switch mechanism, which incidently may be used as a control means in many other mechanisms, provides a switch which is quickly responsive to operations of the governor of the mechanism.

Although only one embodiment of the invention has been illustrated and described, various changes in the form and relative arrangements of the parts may be made to suit requirements.

The governor operated switch mechanism constituting my invention is disclosed in my application No. 118,369, now abandoned filed September 28, 1949, the instant application being a division thereof.

I claim:

1. A governor operated switch mechanism including a casing member, a governor mechanism, including a cam member, housed within the casing member, two switches, each including relatively movable fixed and movable contact members, secured to the exterior of the casing member one of of the contacts of each switch being actuated by the cam member, springs for biasing said contact members into engagement with each other, and two dash pots, one connected to each of the movable switch contacts and operable to delay the switch closing operation of the mechanism.

2. A governor operated switch mechanism including a casing member, a governor mechanism, including a cam member, housed within the casing member, two separate switches including a plurality of fixed contact members and a plurality of movable contact members, secured to the casing member, the movable contact members of the switch mechanism being actuated by the governor mechanism to effect a switch opening operation of the mechanism with the governor mechanism operating at or above a certain speed and the governor and switch mechanism being so constructed and so operative as to have one or the other of the switches closed when the governor is operating at or below a certain speed, switch closing means for biasing the movable contact members into engagement with the fixed contact members, and means, including two separate dash pots, operable to delay the switch closing operation of the two switches.

3. A governor operated switch mechanism including a casing member, a governor mechanism, including a cam member, housed within the casing member, switch mechanism, including a plurality of fixed contacts and a plurality of movable contacts, secured to the casing member the movable contacts of the switch mechanism being actuated by the governor mechanism to effect a switch opening operation of the mechanism with the governor mechanism operating at or above a certain speed and the governor and switch mechanism being so constructed and so operative as to have one or the other of the movable contacts in its switch closed position when the governor is operating at or below a certain speed, spring means for biasing the movable contacts into engagement with the fixed contacts, and dash pot means connected to the several movable contacts and operable to delay the switch closing operation of the switch mechanism.

4. A governor operated switch mechanism including a casing, a switch mechanism, including two independently operable switches, secured to the exterior of the casing and including a plurality of fixed contact members and a plurality of movable contact members, spring means for biasing the movable contact members into engagement with the fixed contact members, dash pot means connected to the movable contact members and operable to delay the closing operation of the switch mechanism, and governor mechanism including a cam member operable to effect an opening operation of both of these switches by moving the movable contact member of each switch away from the fixed contact thereof when the governor mechanism is operating at or above a certain speed, and the governor and switch mechanism being so constructed and so operative as to have one or the other of the switches closed when the governor mechanism is operating at or below a certain speed.

5. A governor operated switch mechanism including a casing, a switch mechanism secured to the casing and including a dash pot mechanism comprising a casing member and a diaphragm member, a fixed switch contact member secured to the latter casing member, a movable switch contact member secured to the diaphragm, a spring housed within the dash pot casing and serving to bias the movable contact member into engagement with the fixed contact member, a governor mechanism housed within the first mentioned casing, and thrust means, secured to the diaphragm and adapted to be actuated by the governor mechanism to effect a switch opening operation of the switch mechanism.

6. A governor operated switch mechanism including a casing, a switch mechanism secured to the casing and including a dash pot mechanism comprising a casing member and a diaphragm member, a fixed switch contact member secured to the latter casing member, a movable switch contact member secured to the diaphragm, a spring housed within the dash pot casing and serving to bias the movable contact member into engagement with the fixed contact member, another dash pot mechanism comprising a casing member and a diaphragm member, a fixed switch contact member secured to the latter casing member, a movable switch contact member secured to the latter diaphragm member, a spring housed within the latter dash pot casing and serving to bias the movable switch contact member into engagement with the fixed contact member; together with a governor mechanism housed within the first mentioned casing, and thrust means, secured to the two diaphragm members and adapted to be actuated by the governor mechanism to effect a switch opening operation of the switch mechanism.

EARL R. PRICE.

References Cited in the file of this patent

UNITED STATES PATENTS

| Number | Name | Date |
|---|---|---|
| 902,101 | McHugh | Oct. 27, 1908 |
| 2,049,637 | Baker | Aug. 4, 1936 |

FOREIGN PATENTS

| Number | Country | Date |
|---|---|---|
| 691,368 | France | Jan. 30, 1930 |